(12) United States Patent
Klaws

(10) Patent No.: US 6,415,692 B1
(45) Date of Patent: Jul. 9, 2002

(54) APPARATUS FOR ROTATING A FASTENING ELEMENT

(75) Inventor: Kai Uwe Klaws, Oerlinghausen (DE)

(73) Assignee: Böllhoff GmbH, Bielefeld (DE)

( * ) Notice: Subject to any disclaimer, the term of this patent is extended or adjusted under 35 U.S.C. 154(b) by 0 days.

(21) Appl. No.: 09/877,982

(22) Filed: Jun. 8, 2001

(30) Foreign Application Priority Data

Aug. 23, 2000 (DE) .......................................... 100 41 358

(51) Int. Cl.[7] ............................................... B25B 13/12
(52) U.S. Cl. ................................. 81/129; 81/44; 81/13
(58) Field of Search ........................ 81/126, 128, 129, 81/54, 55, 13, 44

(56) References Cited

U.S. PATENT DOCUMENTS 3,141,363 A * 7/1964 Ferry ........................... 81/128

FOREIGN PATENT DOCUMENTS

| DE | 31 12 520 D E | 10/1982 |
|----|---------------|---------|
| DE | 260 247 DD | 9/1988 |
| DE | 197 54 275 D E | 6/1998 |

OTHER PUBLICATIONS

H. Grossberndt, Bad Laasphe; Kleinschrauben für die automatische Montage; *Der Zuliefermarkt,* Jul. 1991, pp. 115–122.

* cited by examiner

Primary Examiner—D. S. Meislin
(74) Attorney, Agent, or Firm—Seyfarth Shaw

(57) ABSTRACT

An apparatus for rotating a fastening element comprising a polygonal section such as a hexagonal nut or bolt from an arbitrary angular position to a predetermined angular position. The apparatus comprises a base member having a pocket for receiving the fastening element so as to freely rotatable therein, and a pair of positioning slides arranged on opposite sides of said pocket so as to be displaceable in parallel and opposite directions. The positioning slides have parallel positioning surfaces facing each other and provided with arcuate recesses arranged so that opposite corners of the fastening element when in its arbitrary position project thereinto. When the positioning slides are displaced in opposite directions, the walls of the recesses cooperate with the projecting corners of the fastening element so as to rotate the fastening element from its arbitrary angular position to the predetermined angular position.

9 Claims, 2 Drawing Sheets

APPARATUS FOR ROTATING A FASTENING ELEMENT

BACKGROUND OF THE INVENTION

The present invention relates to an apparatus for rotating a fastening element having a polygonal section such as a hexagonal nut or bolt from an arbitrary angular position to a predetermined angular position.

When fastening elements such as nuts and bolts are to be tightened or released by an automatic tool, the polygonal section of the respective fastening element must be aligned to the actuating portion of the tool. However, when such fastening elements are delivered via e.g. a pneumatic conduit, the fastening elements will be in arbitrary angular positions. It is then necessary to rotate the fastening elements to a predetermined angular position wherein they can be engaged by the actuating portion of the tool.

SUMMARY OF THE INVENTION

It is an object of the present invention to provide an apparatus which allows to rotate a fastening element having a polygonal section from an arbitrary angular position to a predetermined angular position.

The apparatus of the present invention comprises a base member having a pocket for receiving the polygonal section of the fastening element so as to be freely rotatable therein, and a pair of positioning slides arranged in the base member on opposite sides of the pocket so as to be displaceable in parallel and opposite directions between start and end positions by actuating means. The positioning slides have positioning surfaces facing each other and extending in spaced parallel relationship. The positioning surfaces each are provided with an arcuate recess. When the positioning slides are in their start positions, opposite corners of the fastening element when in an arbitrary "mis-aligned" angular position project into the recesses of the positioning slides so that when the positioning slides are displaced in opposite directions, the walls of the recesses cooperate with the projecting corners of the fastening element so as to rotate the fastening element to the desired angular position wherein the positioning surfaces of the positioning slides engage opposite surfaces of the polygonal section of the fastening element.

The fastening element will then be in its predetermined angular position wherein the polygonal section of the fastening element can be engaged e.g. by an actuating portion of an automatic tool.

Preferably the positioning slides are biased by springs in a direction transverse to the direction of displacement so that they are able to perform slight lateral yielding movements opposite to the action of the springs when the positioning slides are moved from their start positions to their end positions. When the positioning slides have reached their end positions, they will be "blocked" so as to be prevented from performing any lateral yielding movements.

BRIEF DESCRIPTION OF THE DRAWINGS

For the purpose of facilitating and understanding of the invention, there is illustrated in the accompanying drawings a preferred embodiment thereof, from an inspection of which, when considered in connection with the following description, the invention, its construction and operation, and many of its advantages should readily understood and appreciated.

DETAILED DESCRIPTION OF THE PREFERRED EMBODIMENT

Figure 1:
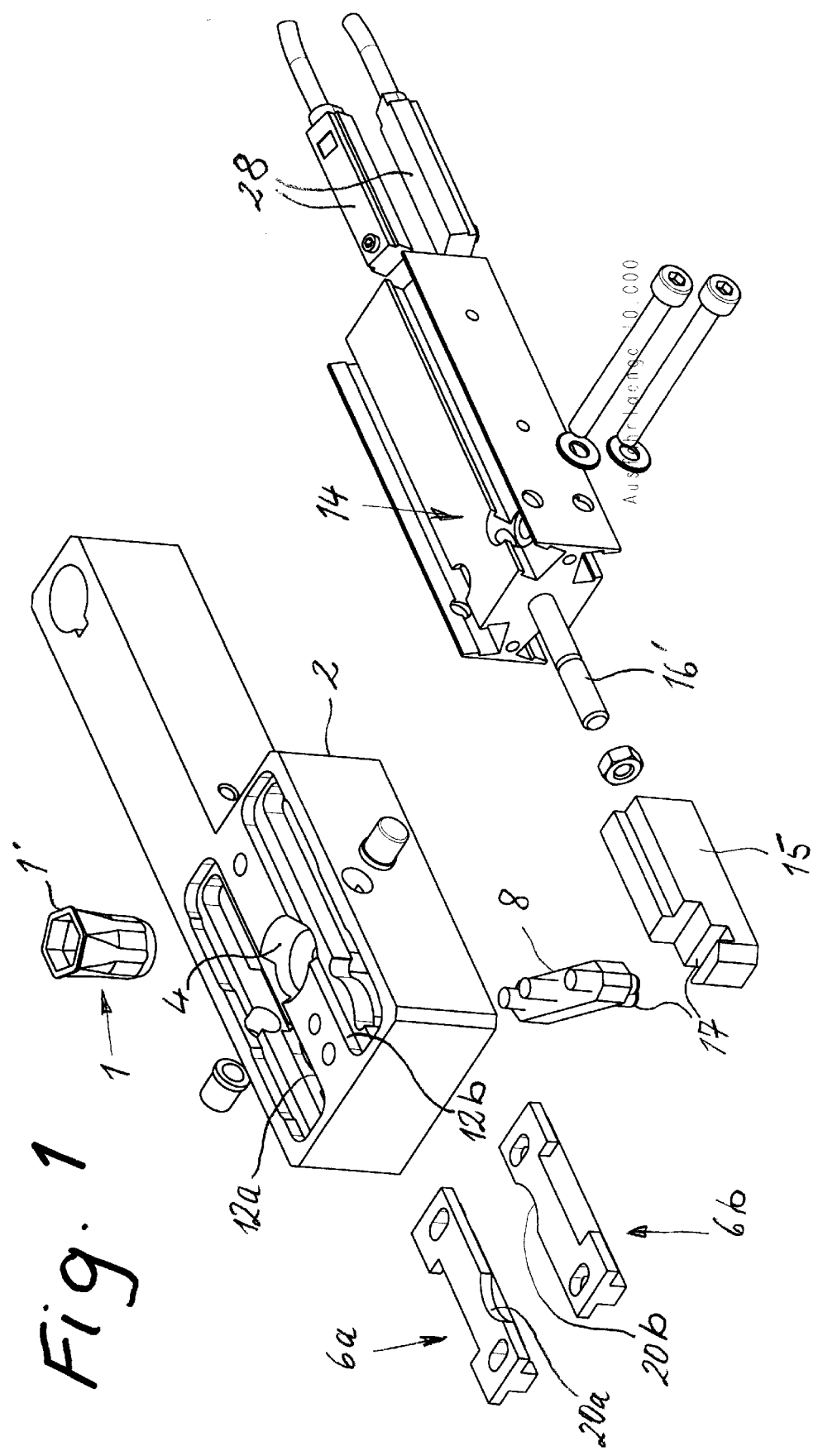
FIG. 1 is a perspective exploded view of an apparatus for rotating a fastening element.

The apparatus shown in the drawings is adapted to rotate a fastening element 1 having a polygonal section 1' from an arbitrary angular position to a predetermined angular position. In the embodiment as shown (see in particular FIG. 1) the fastening element is a hollow hexagonal blind nut. It should be noted, however, that the apparatus can be used in connection with other nuts, with bolts or similar fastening elements. The polygonal section should have an even number of corners, i.e. four, six, etc.

The apparatus comprises a base member 2 having a pocket 4 of a part circular shape and adapted to receive the fastening element 1 so as to be freely rotatable therein. A pair of positioning slides 6a, 6b are arranged on opposite sides of the pocket 4 so that they are displaceable in parallel and opposite directions between a start position (FIG. 2) and an end position (FIG. 3) as will be explained in more detail below.

The positioning slides 6a, 6b are linked to each other by a linking mechanism such that displacement of the one positioning slide 6a in one direction (arrow a) causes displacement of the other positioning slide 6b in the opposite direction (arrow b). In the embodiment as shown the linking mechanism comprises a lever 8 comprising two arms (FIG. 1). The lever 8 is rotatably mounted in the base member 2 by means of a pin and has its two arms connected to the positioning slides 6a, 6b each via elongated hole means 10a and, respectively, 10b. The elongated hole means 10a, 10b each comprise a pin integral with the lever 8 and engaging into a respective elongated hole of the associated positioning slide 6a and, respectively, 6b.

The positioning slides 6a, 6b are slidingly displaceable in longitudinal guide grooves 12a, 12b of the base member 2. For displacing the positioning slides there is provided a pneumatic actuating means comprising a cylinder 14 and a piston 16 which is connected to the lever 8. More particularly the piston 16 has a piston rod 16' fixedly connected to a joining member 15 which engages the lever 8 via pin-and-groove-engagement means 17 for displacing the positioning slides 6a and 6b via the lever 8.

The position slides 6a and 6b are provided at opposed sides with positioning surfaces 18a, 18b, each of which includes an arcuate recess 20a and, respectively, 20b. The recesses 20a, 20b are arranged such that the pocket 4 and the recesses 20a, 20b when the positioning slides 6a and 6b are in their start positions (FIG. 2) form a circular receptacle of a diameter which slightly exceeds the distance between two opposite corners of the polygonal section 1'. This allows to feed the fastening element 1 into the pocket 4 while being in any arbitrary angular position.

Figure 2:
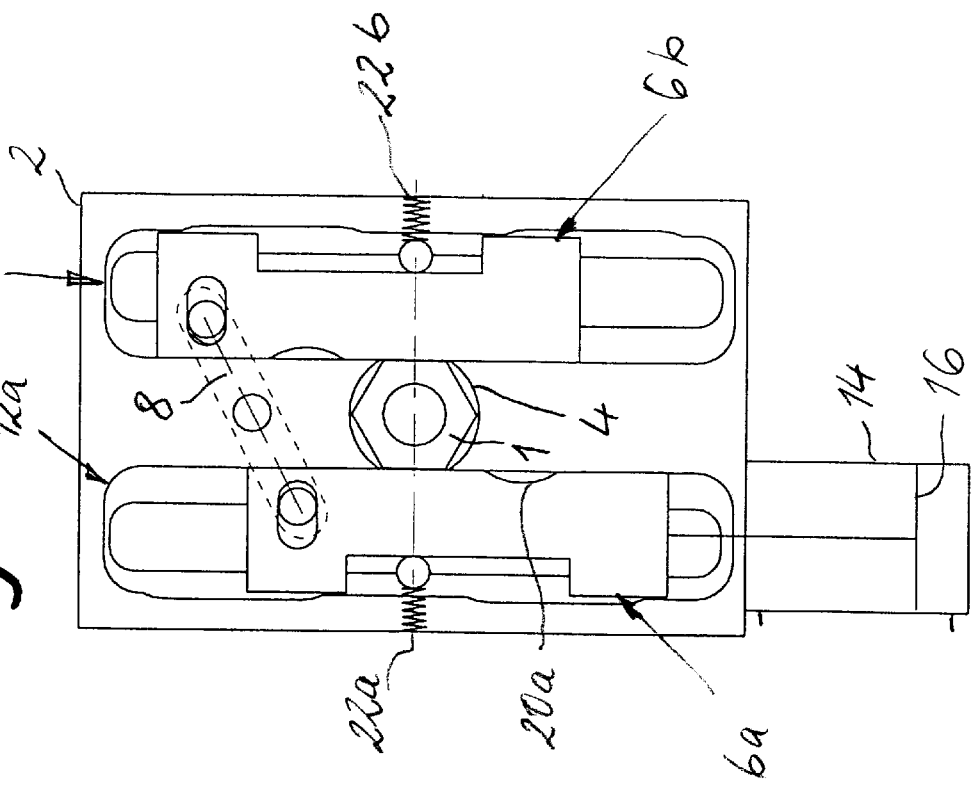
FIGS. 2 and 3 are schematic top plan views of the apparatus in FIG. 1 when in its start position and, respectively, end position.
Figure 3:
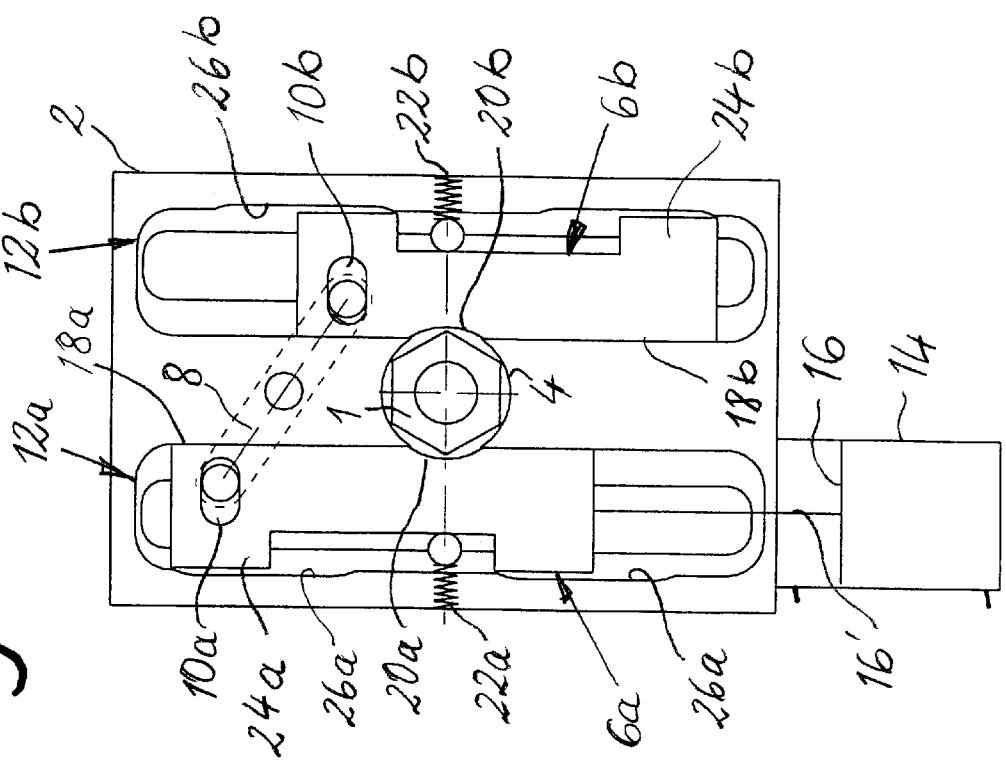

The positioning slides 6a, 6b are laterally biased by springs 22a and b via (schematically shown) spherical pressure members such that their positioning surfaces 18a, b are resiliently urged into engagement with corresponding wall surfaces of the guide grooves 12a, b. The guide grooves 12a, 12b and the positioning slides 6a, 6b are arranged such that the positioning slides 6a, 6b may perform slight lateral yielding movements opposite to the action of springs 22a, 22b when in their start positions (FIG. 2) and when being moved from their start positions in opposite directions. To this end the positioning slides 6a, 6b are provided with lateral extensions 24a, 24b adapted to extend into respective recesses 26a, 26b of the guide grooves 12a, 12b. The length of the recesses 26a, 26b is chosen such that the positioning slides 6a, 6b may perform slight lateral yielding movements only when they are in their start positions and when they are being moved in opposite directions, while they are prevented from moving laterally by side walls of the guide grooves 12a, 12b when they are in their end positions (FIG. 3).

It is to be noted that lateral yielding movements of the positioning slides 6a, 6b are impeded neither by the linking mechanism nor by their connection with the actuating means because they are linked to the lever 8 via the elongated hole means 10a, 10b and to the pneumatic cylinder 14 via the lever 8 and the pin-and-groove-engagement means 17. Furthermore, it is to be noted that the base member 2 has its top side closed by a cover (not shown).

Operation of the described apparatus is as follows:

The fastening element 1 is fed—for example via a pneumatic feed conduit (not shown)—into the pocket 4 of the base member 2 while being in any arbitrary angular position. It will be assumed that the angular position of the fastening element 1 within the pocket 4 is as shown in FIG. 2 wherein opposite corners of the polygonal section 1' project into the recesses 20a, 20b of the positioning slides 6a, 6b. When the positioning slides 6a, 6b are displaced by the piston 16 of the pneumatic actuating means in the directions of arrows a and b, the walls of the recesses 20a, 20b engage the projecting corners of the fastening element 1 so as to rotate the fastening element 1 to an angular position wherein opposite surfaces of the polygonal section 1' are aligned to the positioning surfaces 18a, 18b of the positioning slides 6a, 6b (FIG. 3). The fastening element 1 then will be in its desired angular position wherein it may be gripped for example by an actuating portion of a tool (not shown).

During such operation, while the positioning slides 6a, 6b are displaced from their start positions (FIG. 2) to their end positions (FIG. 3), the positioning slides 6a, 6b may perform, as mentioned above, slight lateral yielding movements opposite to the action of springs 22a, 22b. This avoids any jamming of the fastening element 1 between the positioning slides 6a, 6b when the fastening element 1 is in an "unfavourable" angular position. When the positioning slides 6a, 6b will be in their end positions (FIG. 3), they are prevented from performing any lateral yielding movements. This enables them to retain the fastening element 1 under the action of springs 22a, 22b in its desired angular position so that the fastening element 1 cannot drop when the apparatus is e.g. upside down.

When the positioning slides 6a, 6b are laterally displaced excessively during the above described operation so as to cause jamming of the fastening element 1, the positioning slides 6a, 6b and the piston 16 of the pneumatic cylinder 14 are not able to reach their end positions. This condition can be sensed by end position sensors 28 (see FIG. 1) which will provide a fault signal.

We claim:

1. An apparatus for rotating a fastening element comprising a polygonal section from an arbitrary angular position to a predetermined angular position, comprising:
    a base member including a pocket receiving the polygonal section of said fastening element so as to be freely rotatable therein, and
    a pair of positioning slides which are disposed on opposite sides of said base member so as to be displaceable in parallel and opposite directions with respect to each other between start and end positions by actuating means,
    said pair of positioning slides having lateral parallel positioning surfaces facing each other and provided with arcuate recesses for receiving opposite corners of the polygonal section of the fastening element when said positioning slides are in their start positions such that when said positioning slides are displaced therefrom in opposite directions walls of said recesses cooperate with said corners of the polygonal section so as to rotate the fastening element from said arbitrary angular position to said predetermined angular position wherein said positioning surfaces of said positioning slides engage opposite surfaces of the polygonal section of the fastening element.

2. The apparatus of claim 1 wherein said pocket of said base member and said arcuate recesses of said positioning slides when in their start positions combine to form a circular receptacle of a diameter which slightly exceeds the distance between two opposite corners of said polygonal section of the fastening element.

3. The apparatus of claim 2 wherein said positioning slides are arranged so as to be slidably displaceable in longitudinal guide grooves of said base member.

4. The apparatus of claim 1 wherein said positioning slides are biased by resilient means in a transverse direction so as to allow for slight lateral yielding movements opposite to said resilient means when said positioning slides are moved from their start positions to their end positions.

5. The apparatus of claim 4 wherein said positioning slides when having reached their end positions are prevented from any lateral yielding movements in order to enable said resilient means to urge said positioning slides into engagement with the fastening element therebetween.

6. The apparatus of claim 1 wherein said positioning slides are linked to each other by a linking mechanism such that displacement of one of said positioning slides causes displacement of the other of said positioning slides in the opposite direction.

7. The apparatus of claim 6 wherein said linking mechanism comprises a lever rotatably mounted in said base member and having a pair of arms linked with said positioning slides by elongated hole means.

8. The apparatus of claim 1 wherein said actuating means comprises a pneumatic piston cylinder assembly.

9. The apparatus of claim 7 wherein said actuating means comprises a pneumatic piston-cylinder-assembly and wherein a piston of said piston-cylinder-assembly is connected to said lever by pin-and-groove-engagement means.

* * * * *